Figure 1:
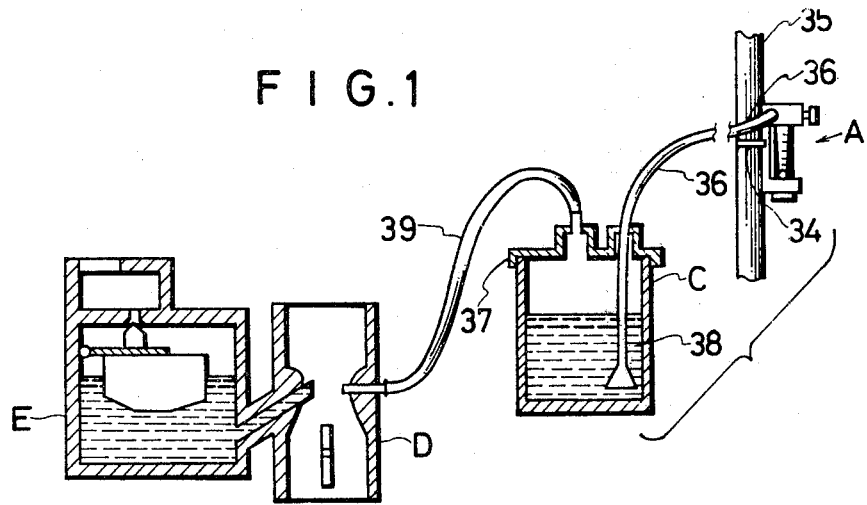

United States Patent [19]
Yoshida

[11] 3,914,995
[45] Oct. 28, 1975

[54] FUEL ADDITIVE AGENT SUPPLYING DEVICE FOR INTERNAL COMBUSTION ENGINES

[76] Inventor: Akira Yoshida, 5271-4 Oya, Ebina, Kanagawa, Japan

[22] Filed: June 5, 1974

[21] Appl. No.: 476,382

[30] Foreign Application Priority Data
June 11, 1973    Japan................................. 48-67971

[52] U.S. Cl. .......................... 73/118; 73/38; 73/209; 116/DIG. 25
[51] Int. Cl.² ..................... G01M 15/00; G01F 1/22
[58] Field of Search ............... 73/209, 116, 118, 38; 116/DIG. 25

[56]        References Cited
        UNITED STATES PATENTS
3,411,357    11/1968    Childs ................................. 73/209
3,696,666    10/1972    Johnson et al. ......................... 73/118
3,751,971    8/1973     Wilcox ................................. 73/209
3,842,671    10/1974    Frizelle ............................... 73/209

Primary Examiner—Richard C. Queisser
Assistant Examiner—Marcus S. Rasco

[57]             ABSTRACT

Air flowing to a fuel additive feed device passes through a filter and thence through a throttling valve and a flowmeter comprising an upright transparent tube with a downwardly tapering interior. A floater in the tube rises to a level dependent upon rate of air flow through it; hence air feed can be kept at a predetermined rate by adjustment of the throttling valve and inability to attain that rate with the throttle valve fully open signifies excessive plugging of the filter.

3 Claims, 4 Drawing Figures

}

U.S. Patent  Oct. 28, 1975  Sheet 1 of 2  3,914,995

FUEL ADDITIVE AGENT SUPPLYING DEVICE FOR INTERNAL COMBUSTION ENGINES

This invention relates to a device for supplying a fuel additive agent such as methyl alcohol the internal combustion engine of an automobile or the like for power increase and fuel economy. More particularly, this invention relates to a device for viewing and controlling air volume coming into an air intake cylinder or a device by which fuel additive agent is fed to an internal combustion engine.

The conventional additive agent supply device in internal combustion engines has as its main part a transparent vessel with an upper lid, which vessel is filled with liquid solution of the additive agent except for a certain space between the liquid level and the lid from which a tube extends through the lid to the carburetor of the internal combustion engine. Another tube for admitting through the lid air extends from the outside and opens into the liquid solution of the additive agent. Normally the air intake port of the latter tube is covered with an air filter. In this additive agent supplying device, as the internal combustion operates, negative pressure is produced in the carburetor whereby vapor of the additive agent solution is introduced into the carburetor and this causes air to be drawn into the additive agent vessel through said air intake port.

However, if such device is used for a long time, the air filter covering the intake port tends to be clogged with dust or the like thereby decreasing the air volume entering the air intake port. Heretofore, in such installations, no means has been provided whereby the variation of incoming air volume could be detected thus the additive agent vapor supplying device did not work well but it nevertheless continued to be used since such fault was unnoticed.

The first object of the present invention is to solve this problem by providing means for enabling observation of the air volume entering the air intake tube connected to an additive agent vessel.

The second object of the present invention is to furnish means to control the air stream while viewing its volume entering in the intake tube.

The third object of the present invention is to furnish means that indicates when the clogged air filter should be replaced.

The fourth object of the present invention is to furnish means for readily removably mounting the air filter.

The fifth object of the present invention is to form said device as a compact size construction to be installed at the driver's station.

To achieve these objects, the present invention provides a novel and improved device for supplying fuel additive agent to the carburetor of an internal combustion engine which comprises a transparent cylinder of the inner surface is tapered to an inverted frustro-conical shape with a floater therein, and having a calibration or indicia on its outer surface, the bottom of the cylinder being provided with a lid having a small aperture and in which there is an air filter to which an air passage communicates, and a valve between said air passage with the air filter and an air intake tube of the additive agent supplying device.

Figure 2:
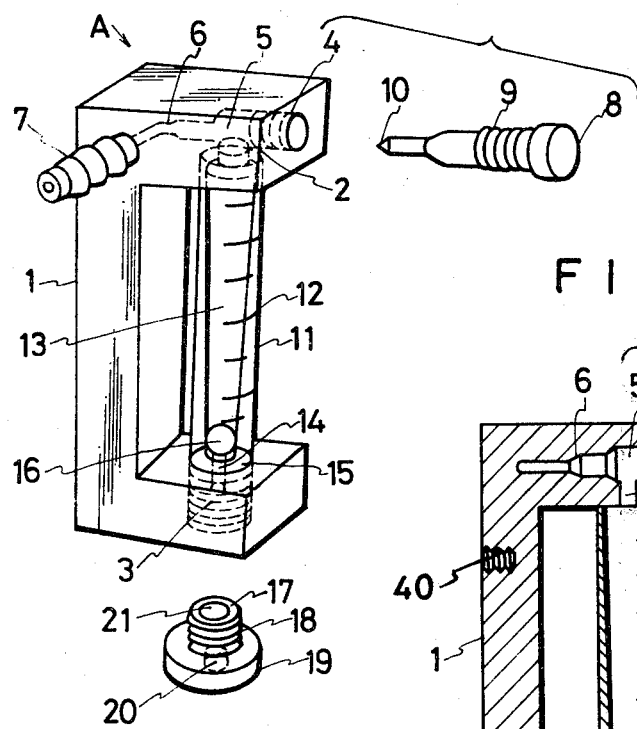
Figure 3:
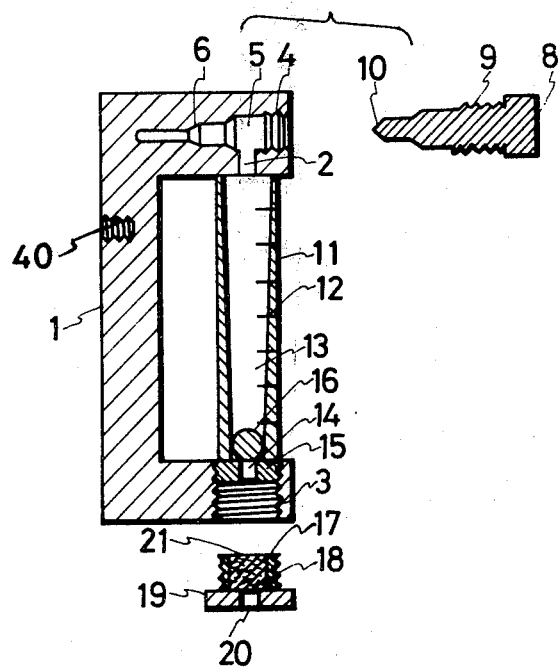
Figure 4:
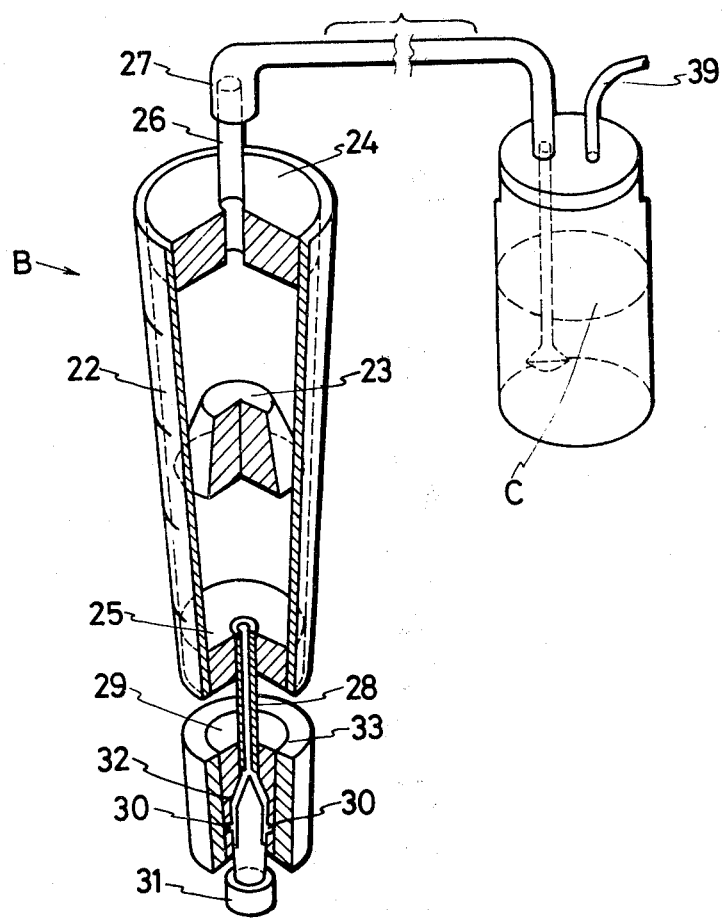

The advantages of the present invention will become more apparent as the description proceeds with reference to the accompanying drawings in which:

FIG. 1 is a diagrammatic illustration of one embodiment of the present invention consisting of an air controlling device according to the present invention, a fuel additive supplying device, a carburetor and a float chamber, FIG. 2 is a perspective view of an embodiment of the air intake controlling device according to the present invention, FIG. 3 is a longitudinal section view of the air intake controlling device shown in FIG. 2, FIG. 4 is a perspective view, with portions shown cut away, of another embodiment of the air intake controlling device according to the present invention.

Referring now to FIG. 1, an air intake controller device A is attached with a bail 34 to the instrument panel 35 of an automobile. An air intake tube 36 is connected to a joint at the upper portion of said controller and extends through a lid 37 of a fuel additive container C and opens into additive liquid 38. A vapor supply tube 39 extends from the lid 37 of the additive container and opens to the inside of a venturi tube carburetor D.

E is the fuel float chamber for the carburetor.

Now considering details of the controller device A, numeral 1 designates a metal frame having a substantially C-shape. The lower leg portion of the frame has a threaded hole 3 extending upwardly therethrough. In upper leg portion of the frame 1, there is a downwardly opening aperture 2 which opens to a lengthwise extending bore or well 5. The bore 5 has a female screw thread 4 in its mouth portion and has a funnel-shaped valve seat portion 6 inwardly of its junction with the aperture 2. At its inner end the bore 5 connects with a lateral bore that opens outwardly to a fitting 7 for an air intake tube. Received in the bore 5 is a needle valve 8 for controlling air, having a male screw thread 9 and the end of which is formed as a conical portion 10 to be engaged in the funnel shape portion 6 of the hole 5. By adjusting the engagement of the needle valve 8 to the hole 5, air volume passing from the aperture 2 to the tube fitting 7 is controlled.

Connecting the hole 3 with the aperture 5 is a transparent cylinder 11 of glass or the like, having a graduated calibration 12 on its face. For this, any indicia may be marked.

The interior of the transparent cylinder 11 defines an inverted frustro-conical space 13, the top of which opens to the aperture 2. The bottom of the transparent cylinder is sealed to the lower leg of the frame 1 by a metal ring 15 having an aperture 14 at its center and threadedly engaged to a female screw 3. There is an air tight seal between the metal ring 15 and the female screw 3.

Thus the transparent cylinder 11 is supported by the frame 1 between its upper and lower portions in which air passages are formed respectively for communication with the inside of the cylinder 11.

A floater 1 such as a ball made of synthetic resin or the like, is placed in the transparent cylinder 11, the floater 16 being of slightly lesser diameter than the bottom of the space 13 of the cylinder 11.

17 is an axially bored cylindrical plug member having a male screw 18. This member has a flange portion 19 in which an inlet aperture 20 is formed. 21 is an air filter material, such as acetate fiber, filling the bore in the cylindrical member 17.

The cylindrical member 17 is engaged in the female screw 3.

40 is a bail hole formed at the back of the frame 1. The controller device thus constructed is placed at the driver's station of an automobile. As shown in FIG. 1, the controller device A, fuel additive agent container C and carburetor D are communicated through the air intake tube 36 and vapor supply tube 39.

As the automobile is driven, vapor from the additive solution 38 in the container C is introduced into the carburetor D due to its low pressure, and thereby air is drawn into the container C through the filter 21. In this instance, since the air passes through the transparent cylinder upwardly from its bottom, the floater 16 is floatingly raised in the cylinder 11. Since the elevation of the floater 16 indicates the air volume passing in a certain time, the needle valve 8 may be adjusted to control the air flow rate by reference to its position. In the event the air filter is clogged with dust or the like, the air stream passing through the transparent cylinder is reduced and the floater 16 rises to a lower position than at the time of normal operation so that the extent of the filter clogging may be noticed. In this instance, the needle valve 8 may be opened more widely to return the floater to its normal high position. Thus air volume introduced to the additive container C can be adjusted for the normal operation and may be maintained at a uniform rate. As by repeating such adjustment, the needle valve 8 is gradually opened, the time of replacing the air filter can be noticed.

Because the air filter 21 is placed under the cylinder in the frame, dust open air will not tend to deposit therein.

FIG. 4 shows another embodiment of the present invention. Therein the controller B of an inverted conical shape cylinder 22 made of transparent glass or the like has on its outer surface a calibration or indicia. In this cylinder 22, a colored floater 23 of conical shape is placed.

An upper lid 24 and the lower lid 25 are fitted on the cylinder 22, each lid having a central aperture. A tube 26 which can comprise a connector fitting is connected to the aperture of the upper lid 24, and this is further connected to a pipe 27 leading to an inlet tube opening to the additive container C.

The bottom lid 25 has an aperture at its center which is connected to a tube 28, the lower portion of which is enlarged to have a thick wall portion 29 through which air intake portions 30 open. In the air passage from these ports 30, a needle valve 31 and valve seat 32 are provided whereby air flowing from the air ports 30 to the transparent cylinder 22 is controlled. 33 is a replaceable air filter covering the air ports 30. The operation and effect of this air controlling device B shown in FIG. 4 are the same as those of the air controlling device A shown in FIGS. 2 and 3.

The present invention is described as above in certain of its embodiments. However it should be noted that any modification thereto will be made without departing from the spirit of the present invention.

What is claimed is:

1. Apparatus by which air that has been passed through a filter can be supplied to a point of utilization at a substantially constant predetermined flow rate notwithstanding gradual plugging of the filter by dirt, and for indicating excessive plugging of the filter that renders it unuseable and necessitates its replacement, said apparatus comprising:
   A. a flowmeter comprising
      1. an upright tube which is of progressively increasing inside diameter upwardly along its length, said tube being at least in part transparent so that its interior is visible along a substantial portion of its length, and
      2. a lightweight body confined in said tube to be levitated by air flowing upwardly through the tube to a position along the length of the tube that depends upon the rate of such airflow;
   B. means defining an air intake in which a filter is replaceably installed;
   C. connection means communicated with the upper end of said upright tube and connectable with a point of air utilization;
   D. a manually adjustable throttling valve; and
   E. means defining an air flow path in series through the air intake, the lower end of said tube and said connection means, which flow path also includes the throttling valve arranged to control the rate of air flow therealong so that a uniform rate of air flow to the point of utilization can be maintained by adjusting the throttling valve by reference to the position of the body along the length of the tube, and so that the need for filter replacement is indicated by inability of the body to attain a predetermined such position with the throttling valve fully open.

2. The apparatus of claim 1, further characterized by:
   F. a substantially C-shaped frame having upper and lower transverse members in which upper and lower end portions of the tube are respectively seated and which are connected by an upright member extending alongside the tube,
      1. the lower transverse member having a bore therethrough that is substantially coaxial with the tube, and
      2. the upper transverse member having a passage therein that is communicated with the upper end of the tube and with the connection means and in which the throttling valve is received; and
   G. the air inlet comprising a plug-like filter member inserted into the bore in the lower transverse member from the bottom thereof.

3. The apparatus of claim 2, further characterized by:
   1. said passage in the upper transverse member of the C-shaped frame comprising
      a. a vertical passage portion extending partway up into the upper transverse member from the underside thereof and which is substantially coaxial with said tube and communicated with its upper end,
      b. a lengthwise passage portion extending along part of the length of the upper transverse member from the end thereof that is remote from the upright member, said lengthwise passage portion defining a needle valve seat and communicating with the vertical passage portion intermediate said needle valve seat and its outer end, and
      c. another passage portion opening from the inner end of said lengthwise passage portion to one side of the upper transverse member and communicating the lengthwise passage portion with said connection means; and
   2. said throttling valve comprising a needle valve element threaded into the outer end portion of said lengthwise passage portion and cooperating with said valve seat.

* * * * *